S. S. FORSTER.
DYNAMO ELECTRIC MACHINE.
APPLICATION FILED JULY 20, 1905.

905,805.

Patented Dec. 1, 1908.

Witnesses.
Harry W. Tilden
Helen Oxford

Inventor:
Samuel S. Forster.
by Albert S. Davis
Att'y.

THE NORRIS PETERS CO., WASHINGTON, D. C.

UNITED STATES PATENT OFFICE.

SAMUEL S. FORSTER, OF SCHENECTADY, NEW YORK, ASSIGNOR TO GENERAL ELECTRIC COMPANY, A CORPORATION OF NEW YORK.

DYNAMO-ELECTRIC MACHINE.

No. 905,805.     Specification of Letters Patent.     Patented Dec. 1, 1908.

Application filed July 20, 1905. Serial No. 270,465.

*To all whom it may concern:*

Be it known that I, SAMUEL S. FORSTER, a citizen of the United States, residing at Schenectady, county of Schenectady, State of New York, have invented certain new and useful Improvements in Dynamo-Electric Machines, of which the following is a specification.

My present invention relates to dynamo electric machines, and more particularly to the construction and arrangement of a magnetic core formed of laminated material and slotted to receive windings.

My invention comprises a novel and useful construction and arrangement of the means employed for supporting the teeth or portions of the laminæ of the core between the coil receiving slots, wherever for any reason it is not desired to support such portions of laminæ by the similar portions of other laminæ or by massive supporting devices.

The various features of novelty which characterize my invention are pointed out with particularity in the claims annexed to and forming a part of this specification. For a better understanding of my invention, however, reference may be had to the accompanying drawings and descriptive matter in which I have illustrated and described one of the forms in which my invention may be embodied.

Figure 1:
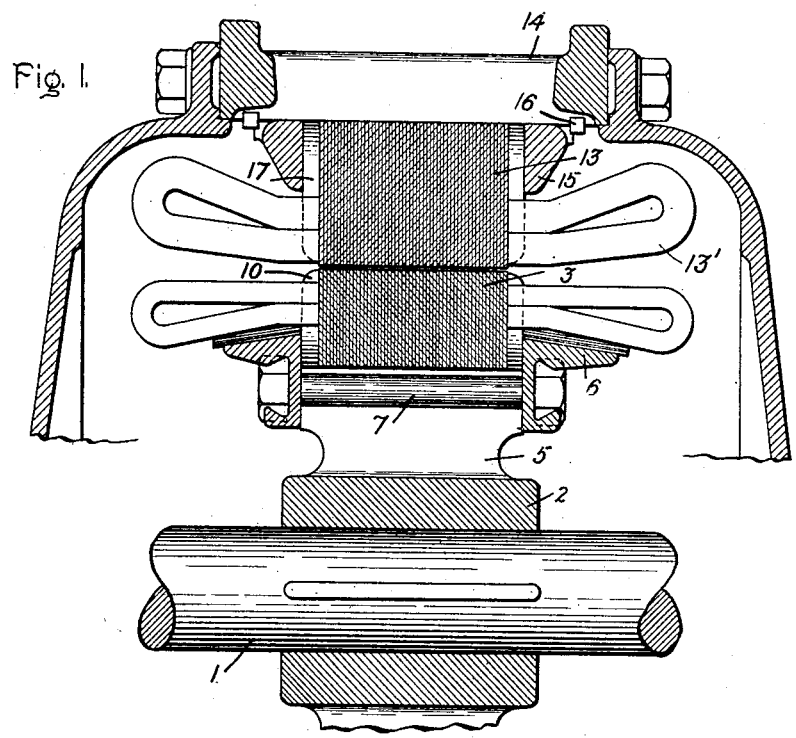
Figure 2:
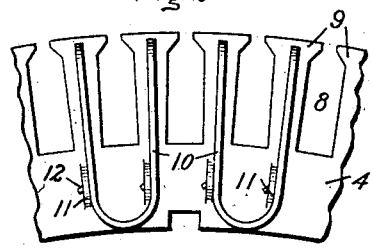
Figure 3:
Figure 4:
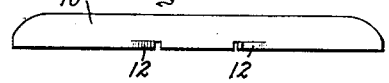
Figure 5:
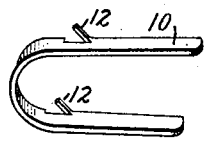

Of the drawings, Figure 1 is a sectional elevation of a portion of a dynamo electric machine; Fig. 2 is an end elevation of a portion of the rotating core; Fig. 3 is a plan view of the partially formed blank from which one of the supporting devices is made; Fig. 4 is an elevation of the same blank; and Fig. 5 is a perspective view of one of the supporting devices.

Referring to the drawings, 1 represents the rotating shaft of a dynamo electric machine upon which is mounted a core supporting spider 2. An annular core 3 formed of laminæ 4 is supported on arms or spokes 5 of the spider, being clamped between annular end members 6 by bolts 7. As is clearly shown in Fig. 2 each lamina 4 is formed with conductor receiving openings 8 between which are core teeth 9. Supporting members or spacers 10 are located between each end lamina and the adjacent end members. Each tooth supporting device 10 may advantageously be formed out of a piece of sheet metal in the form of a U-shaped strip or bar bearing against the end lamina in an edge-on position.

In the particular construction shown one lamina at each end of the core is formed with a plurality of radially extending loops 11 which may be formed integrally from the end laminæ by punching. A loop 11 is located below each core tooth 9. Tangs or integral projections 12 are punched out laterally from the core engaging edges of the strips or bars 10. The projections 12 project laterally in the same direction from the two legs of the device. The projections 12 from each device 10 are proportioned and arranged to be passed under a pair of loops 11. After the projections 12 are passed under the loops 11 the latter may be compressed somewhat to rigidly secure the supporting devices 10 to the end laminæ. When secured each leg of the member 10 extends nearly to the outer end of the tooth 9 at the base of which the leg is secured and preferably the legs are located midway between the side edges of the teeth. It will be understood that when the supporting devices and the core are clamped between the end members 6 that the legs of the supporting devices support the tooth portions of the end laminæ and prevent their distortion at the same time allowing of a certain ventilation between the body of the core and the end members which tends to cool the core and the winding 13' carried by the core.

In the particular construction illustrated, the core 13 of the stator of the machine is supported within an annular frame member 14 by end members 15 which are held in place by keys 16. The core 13 which may be slotted as is the core 4, to receive its windings 13', has tooth supporting devices 17 which may be identical with the devices 10.

The tooth supporting devices may be easily and cheaply constructed in the manner described and possess excellent mechanical properties. By forming the devices of sheet metal with a flat edge against the core and another flat edge against the end member, the weight and bulk of the supporting device is reduced to a minimum. By making the supports for two teeth in a single member connected by a yoke portion, the liability of a support for a tooth collapsing or turning about its longitudinal axis is reduced to a minimum.

What I claim as new and desire to secure by Letters Patent of the United States, is:

1. In combination, a toothed or slotted laminated core, windings between the teeth of said core, and U-shaped members engaging one or more of the laminæ of said core, one leg of each of said U-shaped members bearing against one of the teeth of a lamina and the other leg bearing against another tooth of said lamina, each of said members being formed out of a thin bar or strip of sheet metal, one edge of which bears against said lamina.

2. In a laminated core, a toothed lamina, and a plurality of U-shaped members, one leg of each of said members engaging one tooth of the lamina, and the other leg of said member engaging an adjacent tooth of said lamina, each of said members being formed out of a thin bar or strip of sheet metal, one edge of which bears against said lamina.

3. In combination, a laminated core body having conductor receiving slots, end members between which said core body is compressed, sheet metal spacers between said end members and said core body, each spacer having a portion engaging said core body between one adjacent pair of conductor receiving slots, a second portion engaging the core body between a second pair of adjacent conductor receiving slots, and a third portion uniting the first mentioned portions, and means for securing each spacer to the core lamina against which it bears in an edge-on position.

4. In combination, a laminated core body having conductor receiving slots, end members between which said core body is compressed, spacers between said end members and said core body formed out of a thin bar or strip of sheet metal, each spacer having a portion engaging said core body between one adjacent pair of conductor receiving slots, a second portion engaging said core body between a second pair of adjacent conductor receiving slots, and a third portion uniting the first mentioned portions, and means for securing each spacer to the core lamina against which it bears in an edge-on position.

5. In combination, a laminated core body having conductor receiving slots, end members between which said core body is compressed, spacers between said end members and said core body, each spacer having a portion engaging said core body between one adjacent pair of conductor receiving slots, a second portion engaging said core body between a second pair of adjacent conductor receiving slots, and a third portion uniting the first mentioned portions, each spacer being formed out of a thin bar or strip of sheet metal one edge of which bears against the body of the core.

In witness whereof I have hereunto set my hand this 18th day of July, 1905.

SAMUEL S. FORSTER.

Witnesses:
BENJAMIN B. HULL,
MARGARET E. WOOLLEY.